(12) United States Patent
Cieslak et al.

(10) Patent No.: US 6,240,461 B1
(45) Date of Patent: *May 29, 2001

(54) METHODS AND APPARATUS FOR CACHING NETWORK DATA TRAFFIC

(75) Inventors: Martin Cieslak, Fremont; John Mayes, Atherton; Ricky Kwong Lowe, Menlo Park, all of CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/946,867

(22) Filed: Oct. 8, 1997

Related U.S. Application Data

(63) Continuation-in-part of application No. 08/936,790, filed on Sep. 25, 1997, now abandoned.

(51) Int. Cl.[7] ........................................ G06F 15/16
(52) U.S. Cl. .................... 709/235; 709/105; 709/200; 709/217; 709/225; 709/228
(58) Field of Search .................................. 709/200, 217, 709/225, 238, 104, 235, 105

(56) References Cited

U.S. PATENT DOCUMENTS

| | | | |
|---|---|---|---|
| 4,827,411 | 5/1989 | Arrowood et al. | 364/300 |
| 4,965,772 | 10/1990 | Daniel et al. | 364/900 |
| 5,452,447 * | 9/1995 | Nelson et al. | 395/650 |
| 5,511,208 * | 4/1996 | Boyles et al. | 712/1 |
| 5,555,244 | 9/1996 | Gupta et al. | 370/60.1 |
| 5,611,049 * | 3/1997 | Pitts | 709/200 |
| 5,673,265 | 9/1997 | Gupta et al. | 370/432 |
| 5,751,971 * | 5/1998 | Dobbins et al. | 709/238 |
| 5,774,660 * | 6/1998 | Brendel et al. | 709/201 |
| 5,787,470 * | 7/1998 | DeSimone et al. | 711/124 |
| 5,848,241 * | 12/1998 | Misinai et al. | 709/213 |
| 5,852,717 * | 12/1998 | Bhide et al. | 709/203 |
| 6,006,264 * | 12/1999 | Colby et al. | 709/226 |

OTHER PUBLICATIONS

Martin Arlitt, Ludmila Cherkasova, John Dilley, Rich Friedrich and Tai Jin, OF Hewlett–Packard Laboratories, "Evaluating Content Management Techniques for Web Proxy Caches", Apr. 30, 1999, 9 pages.

Valloppillil, Vinod, "Cache Array Routing Protocol v1.0", Oct. 20, 1997, Internet–Draft, http://ds1.internic/net/internet–drafts/draft–vinod–carp–v1–02.txt, pp. 1–6.

Cisco Technology, Inc., "Configuring IP Routing Protocols," Dec. 10, 1997, http://www.cisco.com/univercd/data/doc/software/11 2/cnp1/5ciprout.htm#REF40277, pp. 1–6, 120–122.

Ousterhout, John K., "A Trace–Driven Analysis of the UNIX 4.2 BSD File System," Jan. 2, 1993, *Computer Science Division, Electrical Engineering and Computer Science*, Unviersity of California, Berkeley, CA, pp. 1–12.

(List continued on next page.)

Primary Examiner—Saleh Najjar
(74) Attorney, Agent, or Firm—Beyer Weaver & Thomas, LLP

(57) ABSTRACT

A method is described herein for facilitating data transmission in a network. A first data request is received at a first intermediate platform, the first data request indicating a source platform and a destination platform. The first data request is redirected by the first intermediate platform to a first cache platform associated with the intermediate platform. Data corresponding to the first data request is transmitted from the first cache platform to the source platform. The data indicates origination from the destination platform.

20 Claims, 3 Drawing Sheets

OTHER PUBLICATIONS

Welch, Brent, "A Comparison of the Vnode and Sprite File System Architectures," Proceedings of the File System Workshop, May 1992, pp. 29–44.

Ousterhout, John K., "Beating the I/O Bottleneck: A Case for Log–Structured File Systems," Jan. 30, 1992, *Computer Science Division, Electrical Engineering anc Computer Sciences*, University of California, Berkeley, CA, pp. 1–17.

* cited by examiner

METHODS AND APPARATUS FOR CACHING NETWORK DATA TRAFFIC

CONTINUING APPLICATION DATA

This application is a continuation-in-part of U.S. patent application Ser. No. 08/936,790 for METHOD AND APPARATUS FOR FACILITATING NETWORK DATA TRANSMISSIONS filed on Sep. 25, 1997 now abandoned, from which this application claims priority.

BACKGROUND OF THE INVENTION

The present invention relates to transmission of data in a network environment. More specifically, the present invention relates to methods and apparatus for improving the efficiency with which data are transmitted over the Internet.

Generally speaking, when a client platform communicates with some remote server, whether via the Internet or an intranet, it crafts a data packet which defines a TCP connection between the two hosts, i.e., the client platform and the destination server. More specifically, the data packet has headers which include the destination IP address, the destination port, the source IP address, the source port, and the protocol type. The destination IP address might be the address of a well known World Wide Web (WWW) search engine such as, for example, Yahoo, in which case, the protocol would be TCP and the destination port would be port 80, a well known port for http and the WWW. The source IP address would, of course, be the IP address for the client platform and the source port would be one of the TCP ports selected by the client. These five pieces of information define the TCP connection.

Given the increase of traffic on the World Wide Web and the growing bandwidth demands of ever more sophisticated multimedia content, there has been constant pressure to find more efficient ways to service data requests than opening direct TCP connections between a requesting client and the primary repository for the desired data. Interestingly, one technique for increasing the efficiency with which data requests are serviced came about as the result of the development of network firewalls in response to security concerns. In the early development of such security measures, proxy servers were employed as firewalls to protect networks and their client machines from corruption by undesirable content and unauthorized access from the outside world. Proxy servers were originally based on Unix machines because that was the prevalent technology at the time. This model was generalized with the advent of SOCKS which was essentially a daemon on a Unix machine. Software on a client platform on the network protected by the firewall was specially configured to communicate with the resident demon which then made the connection to a destination platform at the client's request. The demon then passed information back and forth between the client and destination platforms acting as an intermediary or "proxy".

Not only did this model provide the desired protection for the client's network, it gave the entire network the IP address of the proxy server, therefore simplifying the problem of addressing of data packets to an increasing number of users. Moreover, because of the storage capability of the proxy server, information retrieved from remote servers could be stored rather than simply passed through to the requesting platform. This storage capability was quickly recognized as a means by which access to the World Wide Web could be accelerated. That is, by storing frequently requested data, subsequent requests for the same data could be serviced without having to retrieve the requested data from its original remote source. Currently, most Internet service providers (ISPs) accelerate access to their web sites using proxy servers.

Unfortunately, interaction with such proxy servers is not transparent, requiring each end user to select the appropriate proxy configuration in his or her browser to allow the browser to communicate with the proxy server. For the large ISPs with millions of customers there is significant overhead associated with handling tech support calls from customers who have no idea what a proxy configuration is. Additional overhead is associated with the fact that different proxy configurations must be provided for different customer operating systems. The considerable economic expense represented by this overhead offsets the benefits derived from providing accelerated access to the World Wide Web. Another problem arises as the number of WWW users increases. That is, as the number of customers for each ISP increases, the number of proxy servers required to service the growing customer base also increases. This, in turn, presents the problem of allocating packet traffic among multiple proxy servers.

It is therefore apparent that there is a need for new techniques which improve the efficiency with which data are transferred between platforms. It is also desirable that such techniques be transparent to the end users.

SUMMARY OF THE INVENTION

According to the present invention, methods and apparatus are provided which facilitate the transmission of data between platforms interconnected by any of a variety of network environments. Essentially, the present invention represents an improvement over the proxy server model which is transparent to end users, high performance, and fault tolerant. By altering the operating system code of an existing router (such as those available from Cisco Systems Inc.), the router is enabled to redirect data traffic of a particular protocol intended for a specified port, e.g., TCP with port 80, to one or more caching engines connected to the router via an interface having sufficient bandwidth such as, for example, a 100 baseT interface. If there are multiple caching engines connected to the cache-enabled router, the router selects from among the available caching engines for a particular request based on a simple algorithm according to which a particular group or "bucket" of addresses is associated with each caching engine.

The caching engine to which the request is re-routed "spoofs" the requested destination platform and accepts the request on its behalf via a standard TCP connection established by the cache-enable router. If the requested information is already stored in the caching engine it is transmitted to the requesting platform with a header indicating its source as the destination platform. If the requested information is not in the caching engine, the caching engine opens a direct TCP connection with the destination platform, downloads the information, stores it for future use, and transmits it to the requesting platform. All of this is transparent to the user at the requesting platform which operates exactly as if it were communicating with the destination platform. Thus, the need for configuring the requesting platform to suit a particular proxy configuration is eliminated along with the associated overhead. Moreover, traffic may be easily allocated among as many caching engines as become necessary.

Thus, the present invention provides a method for facilitating data transmission in a network. A first data request is received at a first intermediate platform, the first data request indicating a source platform and a destination platform. The first data request is redirected by the first intermediate platform to a first cache platform associated with the intermediate platform. Data corresponding to the first data request is transmitted from the first cache platform to the source platform. The data indicates origination from the destination platform.

A further understanding of the nature and advantages of the present invention may be realized by reference to the remaining portions of the specification and the drawings.

DESCRIPTION OF SPECIFIC EMBODIMENTS

Figure 1:
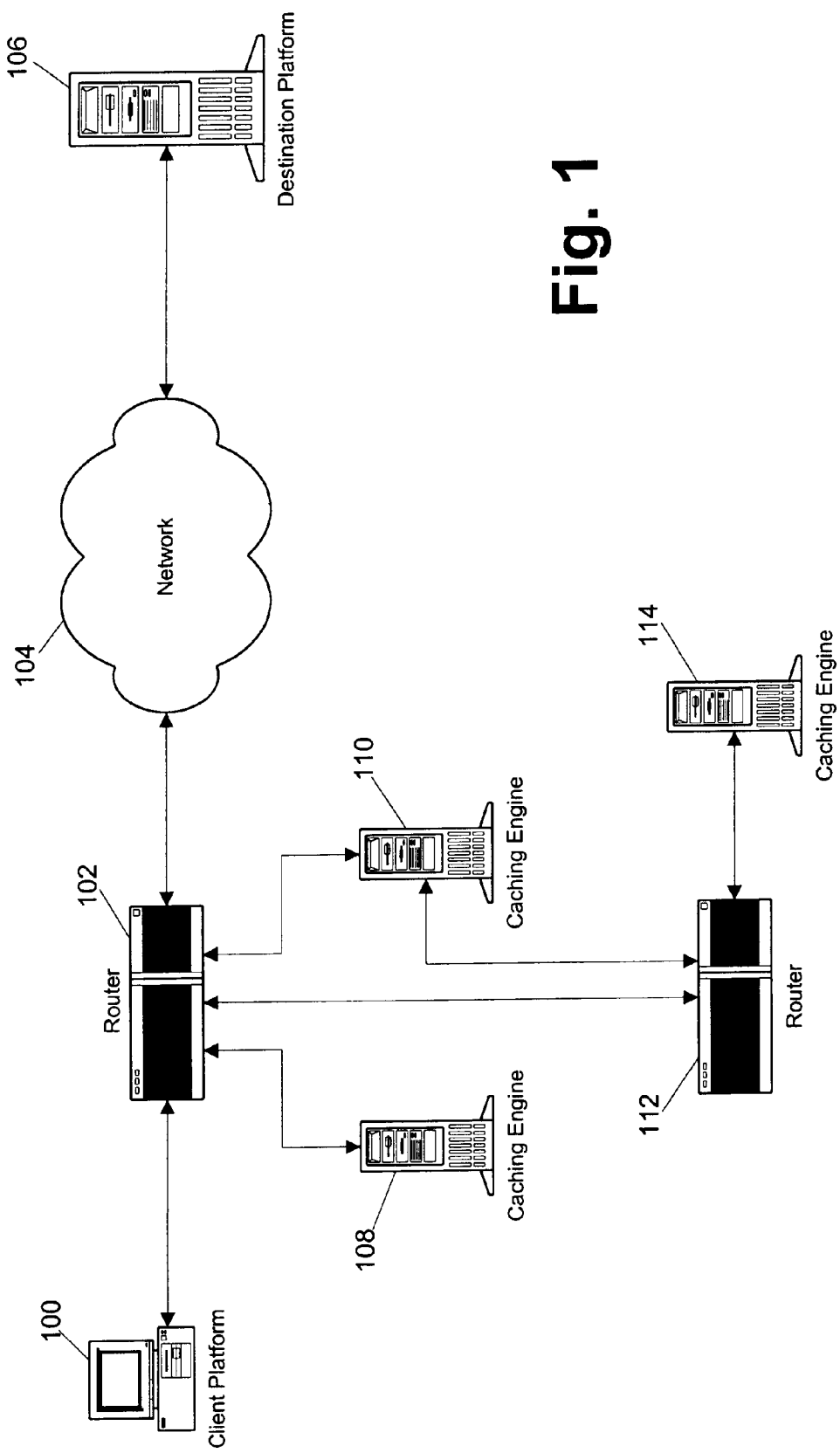
FIG. 1 is a diagram of a hardware environment according to a specific embodiment of the invention.

FIG. 1 shows an example of a hardware environment in which the present invention may be implemented. A client platform 100 is connected to router 102 which is connected via network 104 to destination platform 106. It will be assumed for the purposes of this discussion that client platform 100 is a single personal computer, that router 102 connects platform 100 to the Internet, i.e., network 104, and that destination platform 106 is a server on the World Wide Web. It should be noted, however, that a variety of configurations similar to this simple model may be employed without departing from the scope of the invention. For example, client platform 100 could be personal computer or workstation which is part of a local or wide area network. Router 102 could be an internal router in such a network (e.g., an intranet connection to an internal web page), the network's general gateway to the Internet, a direct connection to destination platform 106, or some intermediate platform between the network and destination platform 106. The connection between router 102 and client platform 100 could include several intervening routers. Network 104 could represent a local or wide area network which includes client platform 100 and router 102, or the Internet. Destination platform 106 could be part of the local or wide area network, or a remote server on the Internet. Caching engines 108 and 110 are connected to router 102. Additional router 112 is connected to router 102 and has an additional caching engine 114 connected thereto.

It will be understood that the caching engines described herein may employ any of a variety of existing file systems and remain within the scope of the invention. For example, the invention may be implemented using a Unix general purpose file system or the equivalent. A particular embodiment of the invention employs the file system described in commonly assigned, copending U.S. patent application Ser. No. 08/937,966, Data transmission over the Internet using a Cache Memory File System. Now U.S. Pat. No. 5,950,205 the entire specification of which is incorporated herein by reference.

Figure 2:
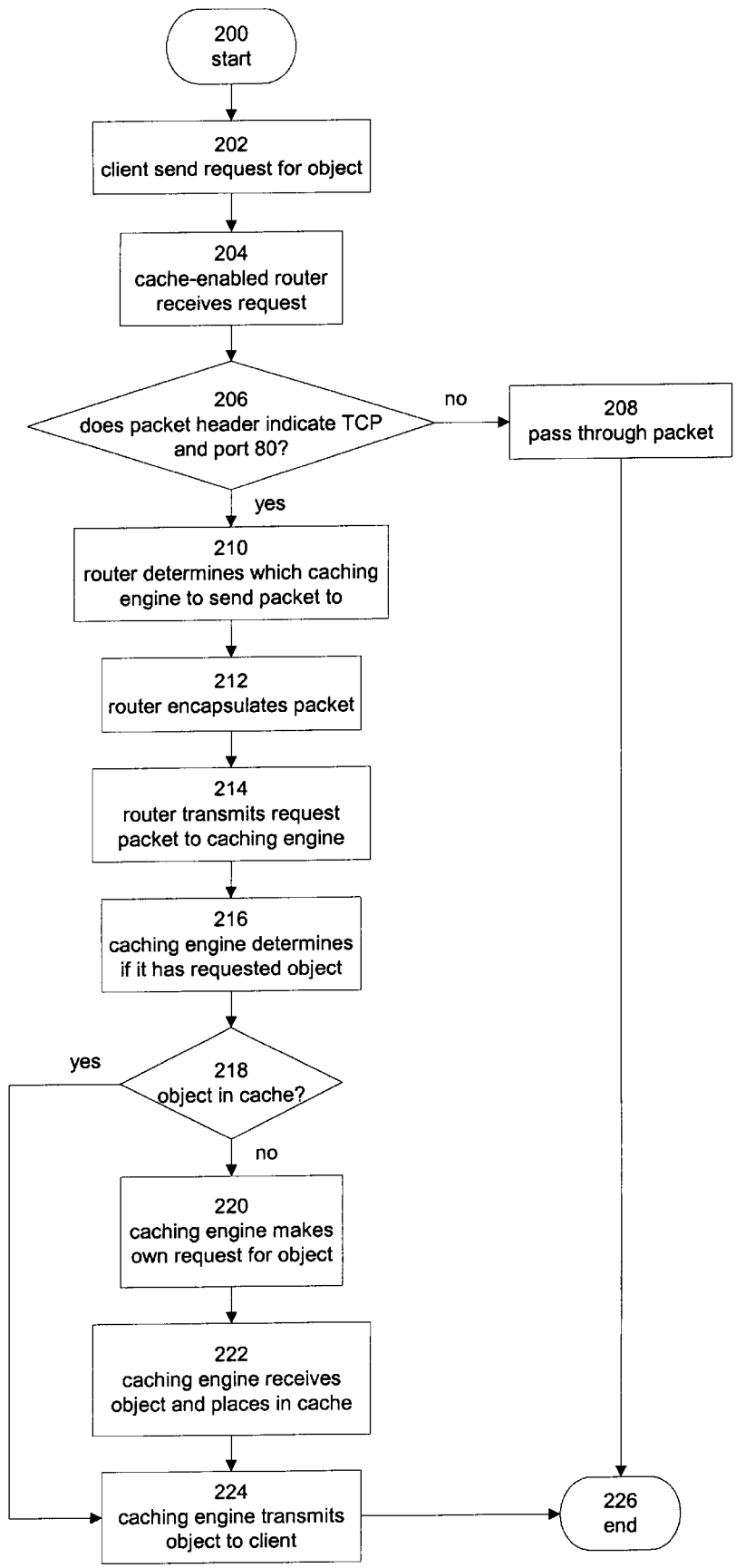
FIG. 2 is a flowchart illustrating the operation of a specific embodiment of the invention.

A specific embodiment of the invention will now be described with reference to FIG. 1 and the flowchart of FIG. 2. Initially, client platform 100 transmits a request to retrieve data such as, for example, a multimedia object from destination platform 106 (step 202). Cache-enable router 102 receives the request in the form of at least one data packet (step 204). Router 102 reads the packet header to determine whether it is a TCP packet and indicates port 80 as its destination port (step 206). It will be understood that this protocol and destination port are used herein merely for illustrative purposes and that a variety of different protocols, destination ports or addresses, and combinations thereof may be employed without departing from the scope of the invention. If the packet is of a different protocol or is not destined for the World Wide Web, the packet is simply passed through the router and routed according to standard Internet protocols (step 208).

If, on the other hand, the protocol is correct and port 80 is specified, the router determines to which of its associated caching engines (108 and 110) it will redirect the packet (step 210) based on the destination IP address specified in the packet. The manner in which this determination is made will be described below with reference to FIG. 4. Obviously, if only one caching engine is associated with the router, this step is unnecessary. Before sending the packet to one of its associated caching engines, router 102 encapsulates the packet for transmission to the selected caching engine by adding another IP header which designates the router as the source of the packet and the caching engine as the destination (step 212). That is, the router encapsulates the packet for transmission to a caching engine which might be several "hops" away. So, for example, router 102 might encapsulate the packet for transmission to caching engine 114 which is connected to router 102 via router 112. Thus, not only may multiple caching engines be associated with a particular router, but multiple routers may be supported by an individual caching engine or a group of caching engines. This allows a tremendous amount of flexibility in where the caching engine and router need to be in relation to each other.

Figure 3A:
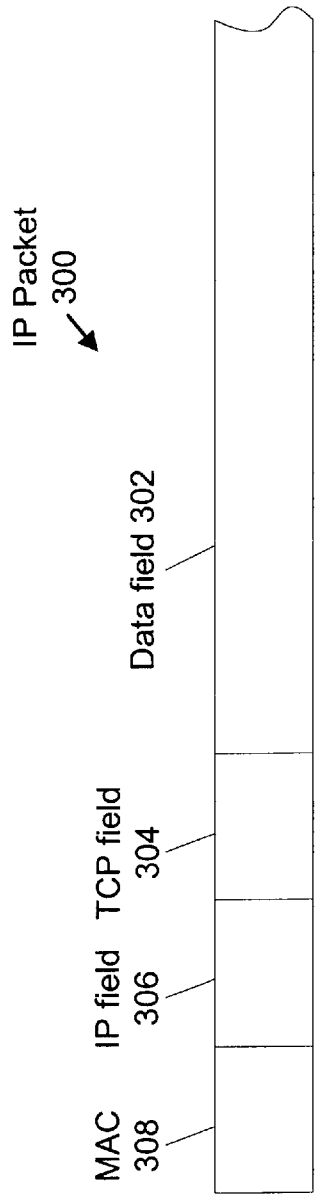
FIGS. 3a and 3b are diagrams illustrating the structure of data packets according to a specific embodiment of the invention.
Figure 3B:
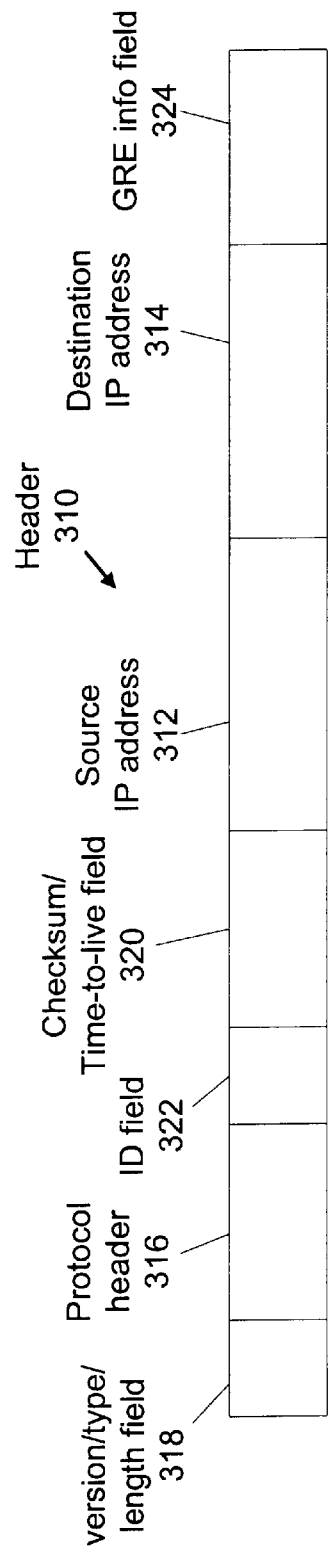

FIG. 3a shows the structure of a conventional IP packet 300. Packet 300 includes data field 302, TCP and IP fields 304 and 306, and MAC 308 which is specific to the current router-to-router link. FIG. 3b shows the structure of a header 310 for an encapsulated packet according to a specific embodiment of the invention. A cache-enabled router designed according to the invention adds 20-byte header 310 to a data packet such as the packet 300 of FIG. 3a. According to a specific embodiment, this is done even where the connection between the router and the designated caching engine is direct. Header 310 is basically another IP header which includes a source IP address 312 (i.e., the IP address of the router), and a destination IP address 314 (i.e., the IP address of the caching engine). A protocol header 316, also referred to as a GRE header, designates the packet as an encapsulated packet. Header 310 also includes a version/type/length field 318, a checksum/time-to-live field 320, and an ID field 322 for facilitating packet fragmentation and reassembly. An additional 4-byte GRE information field 324 identifies one of several GRE protocols being performed which, in this case, is the redirection of web traffic.

Referring once again to FIGS. 1 and 2, router 102 provides connectivity between the client and the selected caching engine and transmits the encapsulated packet to the caching engine (step 214). The caching engine determines if it has the requested object stored locally (step 216) by comparing the packet URL to its directory. If the object is not in the cache (step 216), the caching engine makes its own request for the object (using its own address as the source IP address) to destination platform 106 via router 102 (step 220). That is, router 102 provides connectivity between the caching engine and destination platform 106. The router sees that the new request is from the caching engine (by looking at the source address) and thereby knows not to redirect the packet to the caching engine. This request and the subsequent retrieval of the object from destination platform 106 is done according to standard TCP/IP protocols. The retrieved object is then placed in the memory of the caching engine (step 222) and transmitted to client platform 100 (step 224). If, in step 218 the object is determined to be locally stored in the caching engine, it is transmitted to client platform 100.

In this transmission, the caching engine is acting as the destination platform using a "promiscuous" IP address.

That is, the TCP/IP communication stack in the caching engine actually places a header on the packets sent to the client with the original destination platform's IP address as the source IP address. This is done using the addressing information from the original request. The GRE header, i.e., the encapsulation header (see FIG. 3b), is stripped off before the information is sent to the client. Any necessary fragmentation may also occur here.

According to a specific embodiment, the cache-enabled router of the present invention automatically allocates IP addresses among its associated caching engines, each of which is assigned a number of address sets referred to as "buckets". Each bucket contains a set of IP addresses and is essentially a hashing function which assigns the IP addresses to the associated cache. Initially, the router assigns IP addresses to each of a fixed number of buckets in such a way as to distribute the anticipated traffic as evenly as possible among the buckets. According to a more specific embodiment, dynamic load allocation is effected by reallocating buckets based on the actual traffic seen by each of the caching engines. The traffic load of a particular caching engine could be determined from, for example, whether its processor or disk is overloaded, its response time, the number of packets per unit time relative to other caching engines, etc.

When a new caching engine is associated with a particular cache-enable router, buckets from existing caching engines are allocated to the new caching engine in a roughly even manner, i.e., about the same number from each. The router attempts to preserve the utility of data already stored in the existing caching engines while filling up the new caching engine with new information. According to one embodiment, before the new caching engine is allowed to go out to the original destination platform to service a request, it determines whether it still has a valid copy of the information.

While the invention has been particularly shown and described with reference to specific embodiments thereof, it will be understood by those skilled in the art that changes in the form and details of the disclosed embodiments may be made without departing from the spirit or scope of the invention. For example, the invention has been described with reference to examples in which one or more caching engines are associated with a particular router. It should be noted, however, that each caching engine or group of caching engines may service requests from more than one router and remain within the scope of the invention. Moreover, as mentioned above, the present invention is not limited to application dealing with the Internet or the World Wide Web. Rather, the present invention may be implemented in any of a wide variety of network environments. Such network environments might include, for example, a private intranet. Therefore, the scope of the invention should be determined with reference to the appended claims.

What is claimed is:

1. A method for facilitating data transmission in a network, the network comprising a source platform, a destination platform, a first intermediate platform, and a first cache platform, the method comprising:

receiving a first data request at the first intermediate platform, the first data request indicating the source platform and the destination platform;

redirecting the first data request from the first intermediate platform to the first cache platform associated with the intermediate platform, the redirected first data request including a source IP address associated with the first intermediate platform; and transmitting data corresponding to the first data request from the first cache platform to the source platform, the data indicating origination from the destination platform.

2. The method of claim 1 further comprising:

where the data are not resident in the first cache platform, transmitting a second data request corresponding to the data from the first cache platform to the destination platform; and transmitting the data from the destination platform to the first cache platform.

3. The method of claim 1 further comprising selecting the first cache platform from among a plurality of cache platforms.

4. The method of claim 3 further comprising allocating a range of addresses to each of the plurality of cache platforms.

5. The method of claim 4 wherein the addresses are allocated so as to distribute data traffic among the cache platforms according to a predetermined scheme.

6. The method of claim 5 further comprising reallocating addresses among the cache platforms where actual data traffic patterns deviate from the predetermined scheme.

7. The method of claim 1 wherein the first data request is redirected to the cache platform only where the destination platform corresponds to a specific set of ports.

8. The method of claim 1 wherein the source platform and the destination platform are connected via a local area network.

9. The method of claim 1 wherein the source platform and the destination platform are connected via a wide area network.

10. The method of claim 1 wherein the source platform and the destination platform are connected via the Internet.

11. The method of claim 1 wherein the intermediate platform and the caching platform are connected via a second intermediate platform.

12. The method of claim 1 wherein redirecting the first data request comprises encapsulating the first data request to thereby create an encapsulated data request indicating the intermediate platform as its source and the caching platform as its destination.

13. At least one computer readable medium containing program instructions for facilitating data transmission in a network, the network comprising a source platform, a destination platform, a first intermediate platform, and a first cache platform, said at least one computer readable medium comprising:

computer readable code for redirecting a first data request received at the first intermediate platform to the first cache platform associated with the intermediate platform, the first data request indicating the source platform and the destination platform, the redirected first data request including a source IP address associated with the first intermediate platform; and computer readable code for transmitting data corresponding to the first data request from the first cache platform to the source platform, the data indicating origination from the destination platform.

14. A computer data signal embodied in a carrier wave and representing sequences of instructions which, when executed by at least one processor, cause the at least one processor to facilitate data transmission in a network, the network comprising a source platform, a destination platform, a first intermediate platform, and a first cache platform, the at least one processor performing the steps of:

executing first computer readable code for redirecting a first data request received at the first intermediate platform to the first cache platform associated with the intermediate platform, the first data request indicating the source platform and the destination platform, the redirected first data request including a source IP address associated with the first intermediate platform; and executing second computer readable code for transmitting data corresponding to the first data request from the first cache platform to the source platform, the data indicating origination from the destination platform.

15. An apparatus for facilitating data transmission in a network, the network comprising a source platform and a destination platform, the apparatus comprising:

a first cache platform in the network for receiving and servicing data requests; and a first intermediate platform in the network and associated with the first cache platform for redirecting a first data request to the first cache platform, the first data request being from the source platform and addressed to the destination platform, the redirected first data request including a source IP address associated with the first intermediate platform;

wherein, in servicing the first data request, the first cache platform is operable to transmit data corresponding to the first data request to the source platform, the data indicating origination from the destination platform.

16. The apparatus of claim 15 wherein the first intermediate platform is configured to redirect the first data request to the first cache platform only where the destination platform corresponds to a specific set of ports.

17. The apparatus of claim 15 wherein the first intermediate platform comprises a router.

18. The apparatus of claim 15 wherein the first cache platform comprises a file server.

19. The apparatus of claim 15 further comprising a second intermediate platform between the first intermediate platform and the first cache platform.

20. The apparatus of claim 15 further comprising a second cache platform associated with the first intermediate platform for receiving and servicing some of the data requests from the first intermediate platform.

* * * * *